United States Patent
Kim et al.

(10) Patent No.: US 11,432,209 B2
(45) Date of Patent: Aug. 30, 2022

(54) METHOD FOR MANAGING UE CONTEXT AND DEVICE SUPPORTING THE SAME

(71) Applicant: LG ELECTRONICS INC., Seoul (KR)

(72) Inventors: Seokjung Kim, Seoul (KR); Bokyung Byun, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/763,545

(22) PCT Filed: Nov. 13, 2018

(86) PCT No.: PCT/KR2018/013752
§ 371 (c)(1),
(2) Date: May 12, 2020

(87) PCT Pub. No.: WO2019/093850
PCT Pub. Date: May 16, 2019

(65) Prior Publication Data
US 2020/0351723 A1 Nov. 5, 2020

Related U.S. Application Data

(60) Provisional application No. 62/584,911, filed on Nov. 13, 2017.

(51) Int. Cl.
*H04W 36/00* (2009.01)
*H04W 76/27* (2018.01)
(Continued)

(52) U.S. Cl.
CPC ....... *H04W 36/0033* (2013.01); *H04L 1/1664* (2013.01); *H04W 36/08* (2013.01); *H04W 68/005* (2013.01); *H04W 76/27* (2018.02)

(58) Field of Classification Search
CPC . H04W 36/0033; H04W 76/27; H04W 36/08; H04W 68/005; H04W 60/06; H04W 60/04; H04W 48/20; H04L 1/1664
(Continued)

(56) References Cited

U.S. PATENT DOCUMENTS

2017/0171784 A1 6/2017 Mitsui et al.
2018/0020382 A1* 1/2018 Kim ........................ H04W 8/22
(Continued)

FOREIGN PATENT DOCUMENTS

CN 107295515 10/2017
EP 3704883 9/2020
(Continued)

OTHER PUBLICATIONS

"RAN-based notification area update", 3GPP TSG-RAN WG3 Meeting #97bis, R3-173706, Prague, Czech Republic, Oct. 9-13, 2017 (Year: 2017).*

(Continued)

*Primary Examiner* — Michael Y Mapa
(74) *Attorney, Agent, or Firm* — Lee, Hong, Degerman, Kang & Waimey PC

(57) ABSTRACT

Provided are a method of managing UE context and a device supporting the method. According to one embodiment of the present invention, a method for managing UE context in a wireless communication system includes: receiving a UE context request message including a radio resource control (RRC) establishment cause from a second BS, wherein the first BS and the second BS are located in a same radio access network (RAN)-based notification area (RNA); and when the RRC establishment cause is related to RNA update, transmitting a UE context response message to the second
(Continued)

BS, wherein the UE context response message piggybacks a RRC message requesting a UE to move to a RRC inactive state.

7 Claims, 13 Drawing Sheets

(51) Int. Cl.
    *H04L 1/16*          (2006.01)
    *H04W 36/08*       (2009.01)
    *H04W 68/00*       (2009.01)

(58) Field of Classification Search
    USPC .................. 370/331; 455/436–445, 458, 515
    See application file for complete search history.

(56) References Cited

U.S. PATENT DOCUMENTS

| | | | |
|---|---|---|---|
| 2019/0059128 A1* | 2/2019 | Gage | H04W 52/0206 |
| 2019/0191483 A1* | 6/2019 | Ryoo | H04W 52/0229 |

FOREIGN PATENT DOCUMENTS

| | | |
|---|---|---|
| WO | 2017/126922 | 7/2017 |
| WO | 2017/142363 | 8/2017 |
| WO | 2017/164679 | 9/2017 |
| WO | 2019093850 | 5/2019 |

OTHER PUBLICATIONS

PCT International Application No. PCT/KR2018/013752, International Search Report dated Feb. 19, 2019, 2 pages.

Aalto University et al., "Hybrid paging and location tracking scheme for inactive 5G UEs;" In: 2017 European Conference on Networks and Communications (EuCNC), Finland, IEEE, Jul. 17, 2017, 7 pages.

European Patent Office Application Serial No. 18875583.9, Search Report dated Nov. 4, 2020, 10 pages.

ZTE Corporation, Sane Chips, "Considertion on periodic RAN area update procedure," 3GPP TSG-RAN WG2 Meeting #99bis, R2-1710429, Oct. 2017, 5 pages.

Ericsson, "RAN area updating due to mobility in RRC_Inactive," 3GPP TSG-RAN WG2 Meeting #98, R2-1704120, May 2017, 6 pages.

Huawei, "Stage 2 TP for support of RAN notification area update," 3GPP TSG-RAN WG3 NR Adhoc, R3-172389, Jun. 2017, 2 pages.

Huawei, Intel Corporation, "RAN-based notification area update," 3GPP TSG-RAN WG3 Meeting #97bis, R3-173706, Oct. 2017, 3 pages.

The State Intellectual Property Office of the People's Republic of China Application Serial No. 201880077818.X, Office Action dated May 26, 2022, 7 pages.

\* cited by examiner

METHOD FOR MANAGING UE CONTEXT AND DEVICE SUPPORTING THE SAME

CROSS-REFERENCE TO RELATED APPLICATIONS

This application is the National Stage filing under 35 U.S.C. 371 of International Application No. PCT/KR2018/013752, filed on Nov. 13, 2018, which claims the benefit of U.S. Provisional Application No. 62/584,911, filed on Nov. 13, 2017, the contents of which are all hereby incorporated by reference herein in their entirety.

TECHNICAL FIELD

The present invention relates to a wireless communication system, and more particularly, to a method for managing UE context performed by a first base station and second base station, and a device supporting the same.

BACKGROUND

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, there will be a problem when UE notifies the network that it is still reachable in the RAN-based notification area by using the periodic RAN-based notification area update (RNAU). The UE transits from the RRC-INACTIVE state to the RRC-CONNECTED state to perform the RNAU. Whenever the UE enters to the RRC-CONNECTED state, the new gNB should fetch the UE context from the anchor gNB. However, after the periodic RNAU, the UE returns into the RRC-INACTIVE state and moves within the configured RAN-based notification area. This means that the transfer for the UE context may be repeated whenever the RNAU is triggered.

SUMMARY

According to a prior art, whenever the UE accesses to the gNB to notify the network that it is still reachable in the RAN-based notification area, the UE context should be fetched from the last serving gNB to the new gNB. It may cause the unnecessary signalling and additional latency, even when no data transmission between the UE and gNB may be occurred during the RNAU.

According to an embodiment of present invention, a method performed by a first base station (BS) in a wireless communication system is provided. The method may comprise: receiving a UE context request message including a radio resource control (RRC) establishment cause from a second BS, wherein the first BS and the second BS are located in a same radio access network (RAN)-based notification area (RNA); and when the RRC establishment cause is related to RNA update, transmitting a UE context response message to the second BS, wherein the UE context response message piggybacks a RRC message requesting a UE to move to a RRC inactive state.

The transmitting the UE context response message may include: determining that the first BS keeps a UE context based on the RRC establishment cause which is related to RNA update; and generating the UE context response message not to include a UE context requested by the UE context request message.

The first BS may be last serving base station, and the second BS may be a current serving base station.

The RRC message may be RRC resume message or RRC release message.

The UE context response message may be retrieve UE context fail message.

According to another embodiment of the present invention, a first base station (BS) in a wireless communication system is provided. The first BS may comprise: a transceiver for transmitting or receiving a radio signal; and a processor coupled to the transceiver, the processor configured to: control the transceiver to receive a UE context request message including a radio resource control (RRC) establishment cause from a second base station, wherein the first base station and the second base station are located in a same radio access network (RAN)-based notification area (RNA); and when the RRC establishment cause is related to RNA update, control the transceiver to transmit a UE context response message to the second base station, wherein the UE context response message piggybacks a RRC message requesting a UE to move to a RRC inactive state.

The processor may be further configured to: determine that the first BS keeps a UE context based on the RRC establishment cause which is related to RNA update; and generate the UE context response message not to include a UE context.

The first BS may be last serving base station, and the second BS may be a current serving base station.

The RRC message may be RRC resume message or RRC release message.

The UE context response message may be retrieve UE context fail message.

According to another embodiment of the present invention, a method performed by a second base station (BS) in a wireless communication system is provided. The method may comprise: receiving a radio resource control (RRC) resume request message including a RRC establishment cause from a user equipment (UE), wherein the RRC establishment cause is related to a radio access network (RAN)-based notification area (RNA) update; transmitting a UE context request message including the RRC establishment cause to a first BS, wherein the first BS and the second BS are located in a same RNA; receiving a UE context response message from the first BS, wherein the UE context response message piggybacks a RRC message requesting the UE to move to a RRC inactive state; and forwarding the RRC message to the UE.

The UE context response message may not include a UE context requested by the UE context request message.

The first BS may be last serving base station, and the second BS may be a current serving base station.

The UE context response message may be retrieve UE context fail message.

According to embodiments of the present invention, last serving gNB does not need to send the UE context to the current serving gNB, and the current serving gNB does not need to perform the core network and path switch procedures, if the UE sends a periodic RNAU and the context of the UE does not need to be moved to the serving gNB. That is, the anchor gNB can selectively fetch the UE context towards new gNB in order to relocate the role of the anchor gNB. For the periodic RNAU, since the UE moves back into the RRC-INACTIVE state, it is possible for the anchor gNB to decide whether to transfer UE context to new gNB.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
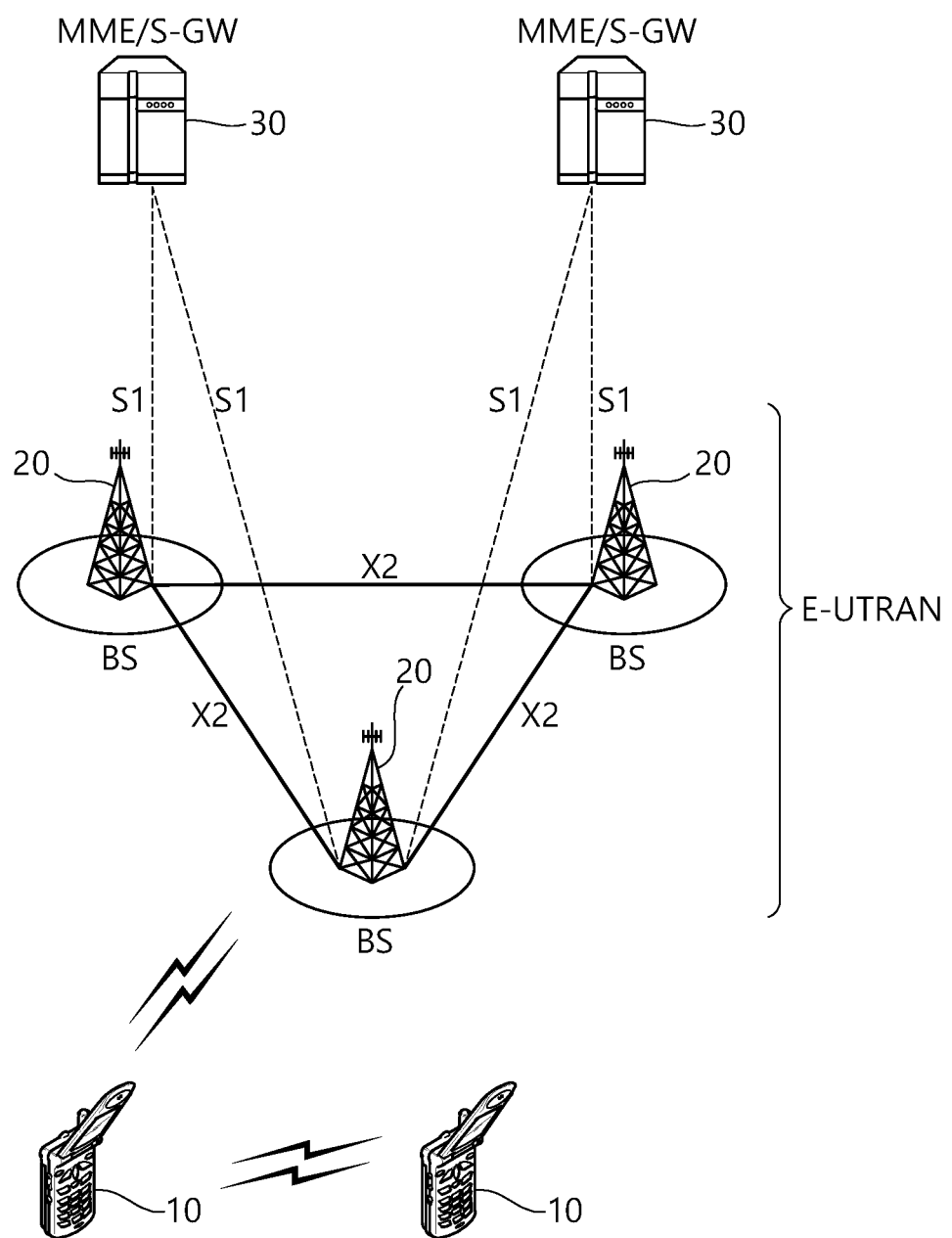
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
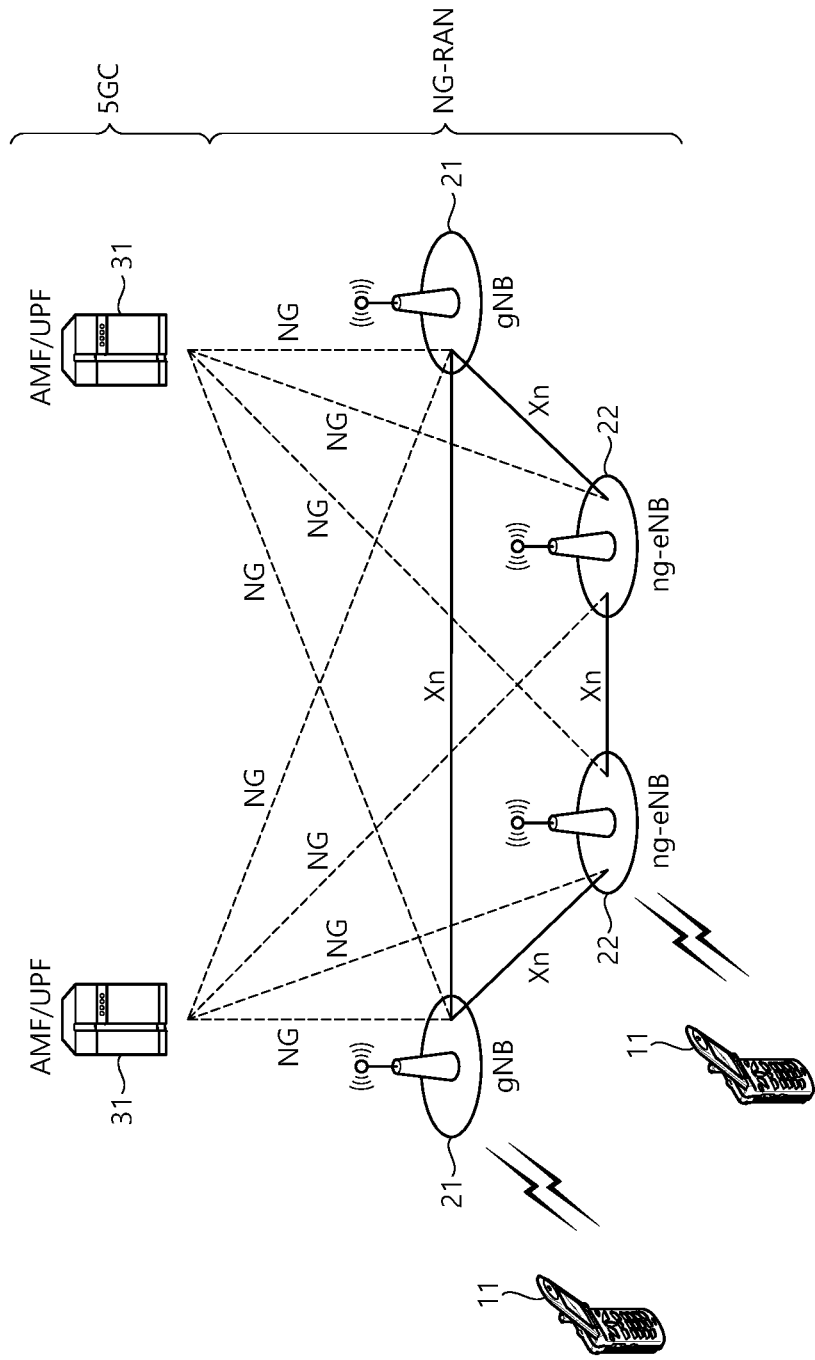
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG.

1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
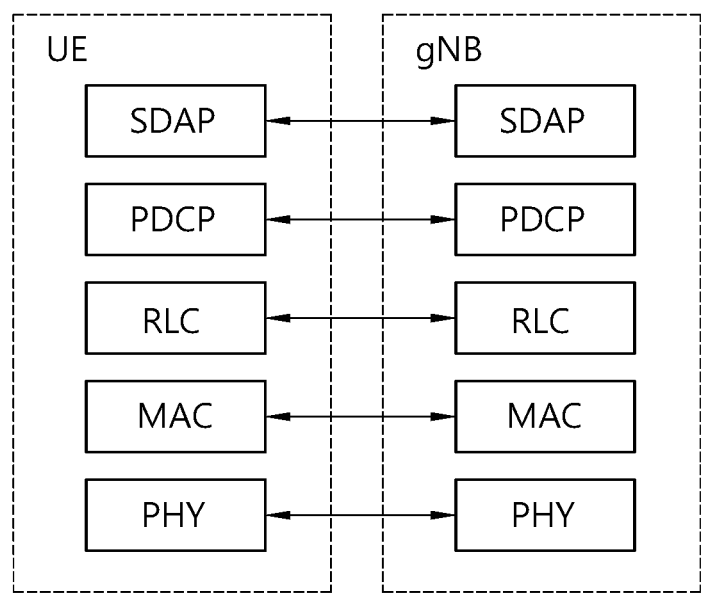
FIG. 3 shows a block diagram of a user plane protocol stack to which technical features of the present invention can be applied.
Figure 4:
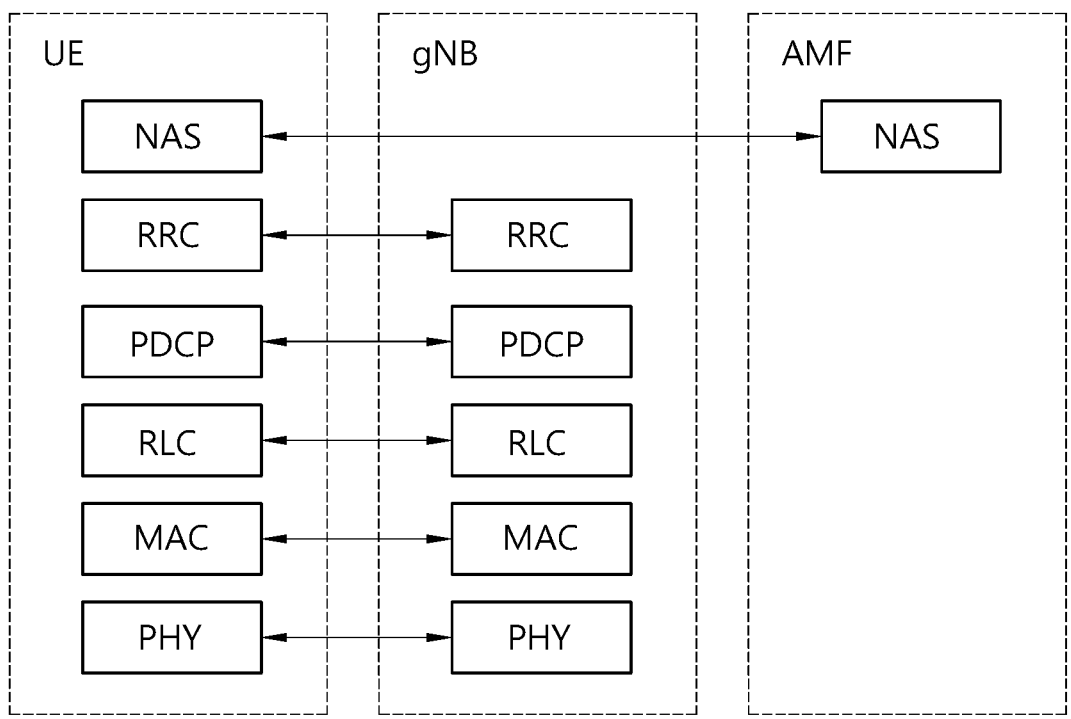
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 0.4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

RRC_INACTIVE is a state where a UE remains in CM-CONNECTED and can move within an area configured by NG-RAN (the RNA) without notifying NG-RAN. In RRC_INACTIVE, the last serving gNB node keeps the UE context and the UE-associated NG connection with the serving AMF and UPF.

If the last serving gNB receives DL data from the UPF or DL signalling from the AMF while the UE is in RRC_INACTIVE, it pages in the cells corresponding to the RNA and may send XnAP RAN Paging to neighbour gNB(s) if the RNA includes cells of neighbour gNB(s).

A UE in the RRC_INACTIVE state can be configured with an RNA, where:
  the RNA can cover a single or multiple cells, and can be smaller than CN area;
  a RAN-based notification area update (RNAU) is periodically sent by the UE and is also sent when the cell reselection procedure of the UE selects a cell that does not belong to the configured RNA.

There are several different alternatives on how the RNA can be configured:
  List of cells:
  A UE is provided an explicit list of cells (one or more) that constitute the RNA.
  List of RAN areas:
  A UE is provided (at least one) RAN area ID, where a RAN area is a subset of a CN Tracking Area;
  A cell broadcasts (at least one) RAN area ID in the system information so that a UE knows which area the cell belongs to.

The UE triggers transition from RRC_INACTIVE to RRC_CONNECTED as follow.

Figure 5:
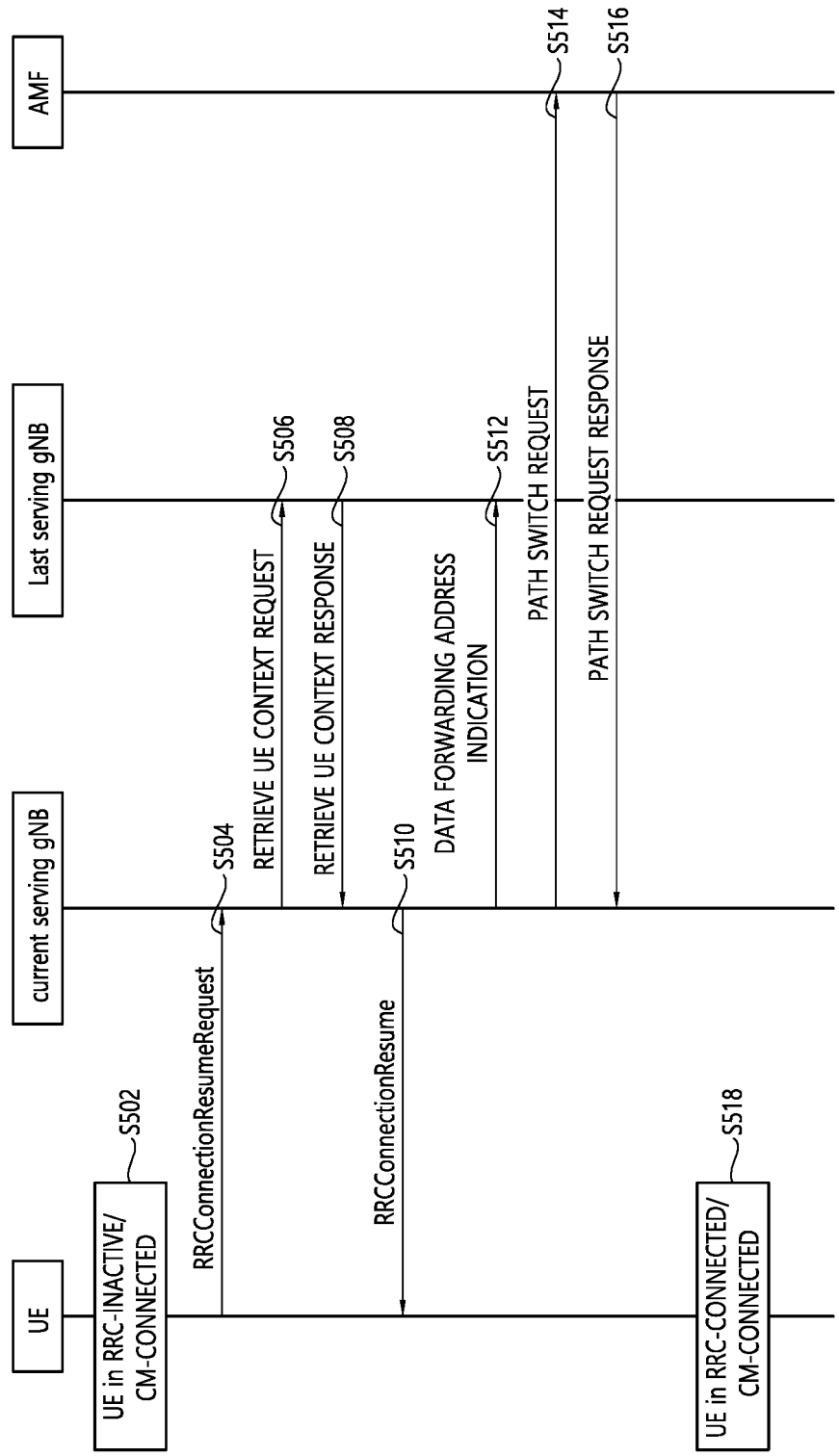
FIG. 5 shows RRC connection resume procedure.

FIG. 5 shows RRC connection resume procedure.

In step S502, the UE is in RRC_inactive/CM-connected state.

In step S504, the UE resumes from RRC_INACTIVE, providing the I-RNTI allocated by the last serving gNB and appropriate cause value, e.g., RAN notification area update.

In step S506, the gNB, if able to resolve the gNB identity contained in the I-RNTI, requests the last serving gNB to provide UE Context.

In step S508, the last serving gNB provides UE context.

In step S510, the gNB may move the UE to RRC_CONNECTED, or send the UE back to RRC_INACTIVE state or send the UE to RRC_IDLE. If the UE is sent to RRC_IDLE, the following steps are not needed.

In step S512, if loss of DL user data buffered in the last serving gNB shall be prevented, the gNB provides forwarding addresses.

In step S514 and S516, the gNB performs path switch.

In step S518, the gNB triggers the release of the UE resources at the last serving gNB.

After step S502 above, when the gNB decides to reject the Resume Request and keep the UE in RRC_INACTIVE without any reconfiguration, or when the gNB decides to setup a new RRC connection, SRB0 (without security) can be used. When the gNB decides to reconfigure the UE (e.g. with a new DRX cycle or RNA) or when the gNB decides to push the UE to RRC_IDLE, SRB1 (with at least integrity protection) shall be used.

As described above, periodic RNAU may be performed using the RRC connection resume procedure. However, referring to FIG. 5, whenever the UE transits from the RRC-INACTIVE state to the RRC-CONNECTED state to perform the RNAU, context fetch may occur. In specific, whenever the UE accesses to the gNB to notify the network that it is still reachable in the RAN-based notification area, the UE context should be fetched from the last serving gNB to the new gNB. However, since no data transmission between the UE and gNB may be occurred during the RNAU, the transfer of the UE context towards new gNB causes the unnecessary signalling and additional latency. Therefore, it is needed for the anchor gNB to skip the UE Context Fetch procedure towards new gNB during the periodic RNAU.

Hereinafter, a method for managing UE context according to an embodiment of the present invention is described. In this embodiment, issues for efficient UE context management during periodic RAN-based notification area update (RNAU) are to be handled.

Figure 6:
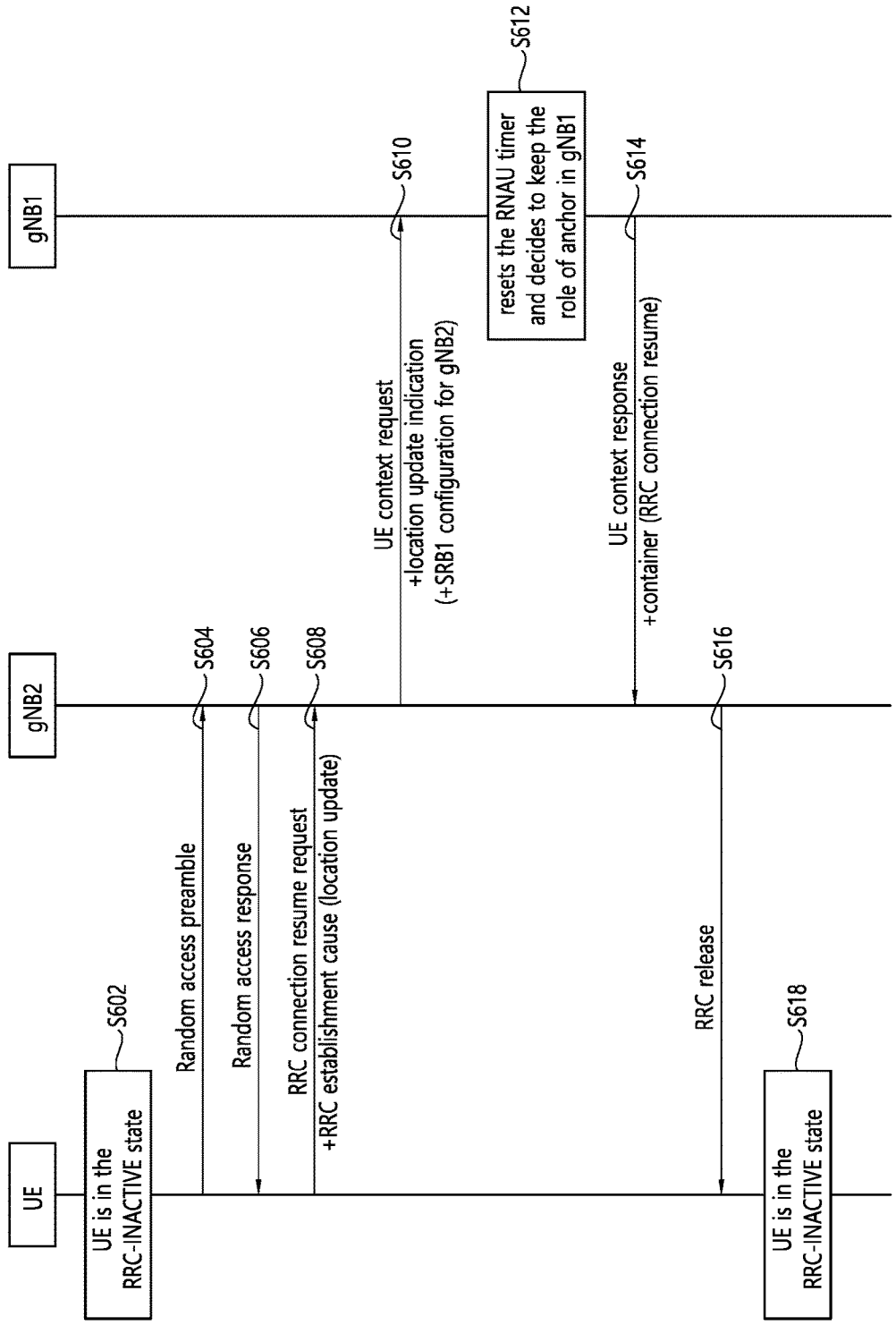
FIG. 6 shows an example of a method for managing UE context according to an embodiment.

FIG. 6 shows an example of a method for managing UE context according to an embodiment of the present invention. In this embodiment, it may be suggested that when the data transmission is not needed and when the reachability for the UE is confirmed by the periodic RNAU, the anchor gNB may determine to keep the role of anchor gNB and may skip the transfer of the UE context towards new gNB. In other words, the anchor gNB may not perform unnecessary UE context fetch. In order for the new gNB to move the UE back into RRC-INACTIVE state with at least integrity protection, the anchor gNB may generate a RRC message to keep the UE in RRC_INACTIVE state based on the SRB1 configuration for the new gNB.

In this embodiment, the anchor gNB may be a base station of a cell in which the UE was located previously, and the new gNB may be a base station of a cell in which the UE is located currently. In other words, the UE was being served by an anchor gNB, and the UE transits to RRC inactive while being served by the anchor gNB. After that the UE moves toward another gNB, e.g. new gNB while the UE is in RRC inactive state. Further, it is assumed that the anchor gNB and the new gNB are in same RAN-based notification area. Hereinafter, the anchor gNB may be last serving gNB, which may be also referred as gNB1. The new gNB may be current serving gNB, which may be also referred as gNB2.

In step S602, the UE may be in RRC-INACTIVE state. The NG connection between gNB1 and NGC is maintained.

In step S604, when the reachability timer (i.e. periodic RNAU timer) in the UE is expired, the UE may trigger the periodic RNAU procedure to notify the network that the UE is still reachable in the RAN-based notification area. When the UE moves to the gNB2 other than the anchor gNB (=gNB1), because the gNB1 and gNB2 are in the same RAN-based notification area, the UE may access to the gNB2. Thus, the UE in RRC-INACTIVE state may send a message for access to the gNB. For example, the UE may transmit a RANDOM ACCESS PREAMBLE message, RRC resume request message or new message to the gNB2.

In step S606, on receiving the message from the UE, the gNB2 may respond to the UE. For example, the gNB2 may transmit RANDOM ACCESS RESPONSE message to the UE.

In step S608, in order to resume the RRC connection, the UE may send the RRC RESUME REQUEST message or new message to the gNB2. This message may include the Resume ID to identify the UE context in the gNB. The RRC establishment cause about the RNAU is included in this message to inform the network of triggering the RNAU. In other words, the UE may transmit a message informing that the RRC connection resume is related to the RNAU. For example, the UE may provide the I-RNTI allocated by the last serving gNB and appropriate cause value, e.g., RAN notification area update.

In step S610, upon reception of the RRC RESUME REQUEST message or new message, the gNB2 may check whether it is able to find the UE context related to the Resume ID or not. If not, the gNB2 may identify the anchor gNB(=gNB1) with the Xn interface which has provided the Resume ID. When to find the anchor gNB(=gNB1), the gNB2 may decide to fetch the UE context from the gNB1 by using the existing Retrieve UE Context procedure or new procedure via the Xn interface. Therefore, the gNB2 may send to the gNB1 the UE context request message or new message. The UE context request message may be a RETRIEVE UE CONTEXT REQUEST message. This message may include the Location update indication or RRC establishment cause to indicate that the UE accesses to the gNB2 for checking the reachability. In addition, the SRB1 configuration for gNB2 may be included in this message. That is, the gNB2, if able to resolve the gNB identity contained in the I-RNTI, may request the last serving gNB to provide UE Context, providing the cause value received in step S610.

In step S612, on receiving the message including the Resume ID from the UE, the gNB1 may check whether it is able to find the UE context related to the Resume ID or not. Based on the RRC establishment cause or Location update indication in the RETRIEVE UE CONTEXT REQUEST message, the gNB1 can be also aware of that this procedure is the RNAU for the UE to notify the network that it is still reachable. When to exactly find the UE context based on the Resume ID, the gNB1 may reset the RNAU timer for that UE. Then, if the UE remains within the same RAN-based notification area and there is no data transmission between the gNB1 and UE, the gNB1 may decide to keep the role of anchor gNB. In this case, the gNB1 may not forward the UE context to the gNB2. In order for the gNB2 to move the UE back into RRC-INACTIVE state with at least integrity protection, the gNB1 may generate a RRC message that keeps the UE in RRC_INACTIVE state. The RRC message may request the UE to move to a RRC_INACTIVE state. For example, the RRC message may be RRC release message.

In step S614, the gNB1 may send to the gNB2 the RRC message via a container in UE context response message. That is, the UE context response message may include the container which piggybacks the RRC message. The UE context response message may be a RETRIEVE UE CONTEXT FAILURE message including an encapsulated RRC release message. Further, the RRC release message may include suspend configuration, if the last serving gNB decides to keep the UE in RRC_INACTIVE. If the RRC release message does not include the suspend configuration, the UE received that RRC release message may transit to RRC_IDLE state. This UE context response message may not include the UE context.

In step S616, on receiving the message from the gNB1, the gNB2 may know the anchor gNB's intention of that it decides not to relocate the anchor gNB. Therefore, the gNB2 may not trigger the Path Switch procedure towards to the NGC. The gNB2 may transparently forward to the UE the RRC message. Thus, the gNB2 may forward RRC release message and suspend configuration to the UE. The RRC message sent by the gNB2 to the UE may be at least one of RRC RESUME message or the RRC RELEASE message.

In step S618, the UE may be still in RRC-INACTIVE state.

According to an embodiment of the present invention, when the periodic RNAU is triggered, the anchor gNB can remove unnecessary signaling by skipping the UE context fetch towards new gNB.

Figure 7:
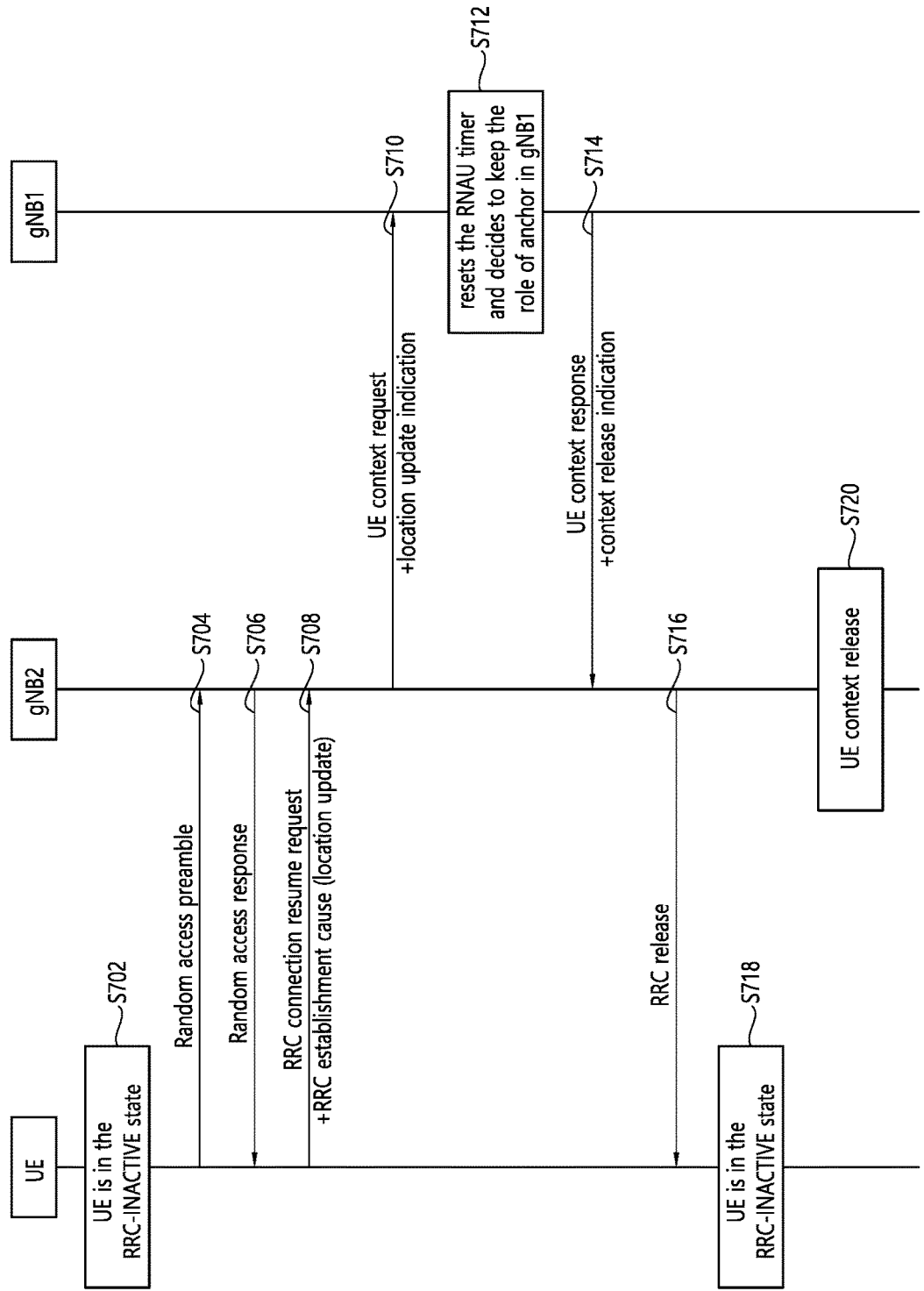
FIG. 7 shows another example of a method for managing UE context according to an embodiment

FIG. 7 shows another example of a method for managing UE context according to an embodiment. In this embodiment, it may be suggested that when the data transmission is not needed and the reachability for the UE is confirmed by the periodic RNAU, the anchor gNB may determine to keep the role of anchor gNB. However, in order for the new gNB to move the UE back into RRC-INACTIVE state with at least integrity protection, the anchor gNB may deliver the UE context to the new gNB with the Context release indication. Based on this indication, after generating and sending the RRC resume message or RRC release message to the UE, new gNB may enable to release its context for that UE.

In this embodiment, the anchor gNB may be a base station of a cell in which the UE was located previously, and the new gNB may be a base station of a cell in which the UE is located currently. In other words, the UE was being served by an anchor gNB, and the UE transits to RRC inactive while being served by the anchor gNB. After that the UE moves toward another gNB, e.g. new gNB while the UE is in RRC inactive state. Further, it is assumed that the anchor gNB and the new gNB are in same RAN-based notification area. Hereinafter, the anchor gNB may be last serving gNB, which may be also referred as gNB1. The new gNB may be current serving gNB, which may be also referred as gNB2.

In step S702, the UE may be in RRC-INACTIVE state. The NG connection between gNB1 and NGC is maintained.

In step S704, when the reachability timer in the UE is expired, the UE may trigger the Periodic RNAU procedure to notify the network that the UE is still reachable in the RAN-based notification area. When the UE moves to the gNB2 other than the anchor gNB(=gNB1), because of the gNB1 and gNB2 are in the same RAN-based notification area, the UE may access to the gNB2. Thus, the UE in RRC-INACTIVE state may send a message for access to the gNB. For example, the UE may transmit a RANDOM ACCESS PREAMBLE message, RRC resume request message or new message to the gNB2.

In step S706, on receiving the message from the UE, the gNB2 may respond to the UE. For example, the gNB2 may transmit RANDOM ACCESS RESPONSE message to the UE.

In step S708, in order to resume the RRC connection, the UE may send the RRC RESUME REQUEST message or new message to the gNB2. This message may include the Resume ID to identify the UE context in the gNB. The RRC establishment cause about the RNAU is included in this message to inform the network of triggering the RNAU. In other words, the UE may transmit a message informing that the RRC connection resume is related to the RNAU. For example, the UE may provide the I-RNTI allocated by the last serving gNB and appropriate cause value, e.g., RAN notification area update.

In step S710, upon reception of the RRC RESUME REQUEST message or new message, the gNB2 may check whether it is able to find the UE context related to the Resume ID or not. If not, the gNB2 may identify the anchor gNB(=gNB1) with the Xn interface which has provided the Resume ID. When to find the anchor gNB(=gNB1), the gNB2 may decide to fetch the UE context from the gNB1 by using the existing Retrieve UE Context procedure or new procedure via the Xn interface. Therefore, the gNB2 may send to the gNB1 the UE context request message or new message. The UE context request message may be a RETRIEVE UE CONTEXT REQUEST message. This message may include the Location update indication or RRC establishment cause to indicate that the UE accesses to the gNB2 for checking the reachability. That is, the gNB2, if able to resolve the gNB identity contained in the I-RNTI, may request the last serving gNB to provide UE Context, providing the cause value received in step S708 (via RRC resume request message).

In step S712, on receiving the message including the Resume ID from the UE, the gNB1 may check whether it is able to find the UE context related to the Resume ID or not. Based on the RRC establishment cause or Location update indication in the RETRIEVE UE CONTEXT REQUEST message, the gNB1 may be also aware of that this procedure is the RNAU for the UE to notify the network that it is still reachable. When to exactly find the UE context based on the Resume ID, the gNB1 may reset the RNAU timer for that UE. Then, if the UE remains within the same RAN-based notification area and there is no data transmission between the gNB1 and UE, the gNB1 may decide to keep the role of anchor gNB.

In step S714, the gNB1 may send to the gNB2 the UE context response message or new message. The UE context response may be a RETRIEVE UE CONTEXT RESPONSE message. When the gNB1 decides not to relocate the anchor gNB, the context release indication may be also included with the UE context response message.

In step S716, on receiving the message from the gNB1, the gNB2 may know the anchor gNB's intention of that it decides not to relocate the anchor gNB based on the context release indication. Therefore, the gNB2 just generates the RRC CONNECTION RESUME message based on the UE context received from the gNB1 and sends it to the UE in order to move the UE back into the RRC-INACTIVE state with at least integrity protection.

In step S718, the UE may be still in RRC-INACTIVE state.

In step S720, the gNB2 may release the context for the UE in the RRC-INACTIVE state.

According to an embodiment of the present invention, when the periodic RNAU is triggered, the anchor gNB may remove unnecessary signallings by skipping the UE context fetch towards new gNB.

Further, the embodiments of the present invention can be also applied to CU-DU split in NR case for resuming the UE context in the RRC-INACTIVE UE. This solution can be also applied to CU-DU split in LTE case for resuming the UE context in the NB-IoT UE and the lightly connected UE.

According to embodiments of the present invention, last serving gNB does not need to send the UE context to the current serving gNB, and the current serving gNB does not need to perform the core network and path switch procedures, if the UE sends a periodic RNAU and the context of the UE does not need to be moved to the serving gNB. That is, the anchor gNB can selectively fetch the UE context towards new gNB in order to relocate the role of the anchor gNB. For the periodic RNAU, since the UE moves back into the RRC-INACTIVE state, it is possible for the anchor gNB to decide whether to transfer UE context to new gNB. In addition, the anchor gNB may confirm the reachability for the UE without the state transition procedure. Therefore, these embodiments can make the UE's experience better (e.g. state transition from the RRC-INACTIVE state (or light connection in LTE) to the RRC-CONNECTED state can be removed).

Figure 8:
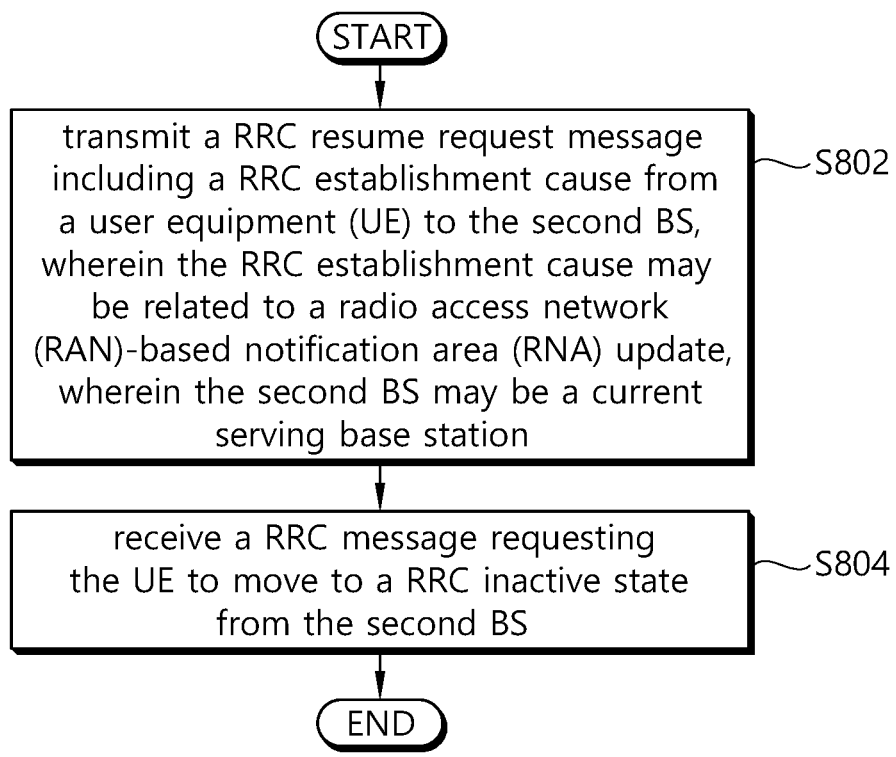
FIG. 8 shows an example of a method for managing UE context according to the present invention.

FIG. 8 shows an example of a method for managing UE context according to the present invention.

In step S802, the first base station (BS) may receive a UE context request message including a radio resource control (RRC) establishment cause from a second BS. The first BS and the second BS may be located in a same radio access network (RAN)-based notification area (RNA). The first BS may be last serving base station, and the second BS may be a current serving base station.

In step S804, the first base station may transmit a UE context response message to the second BS when the RRC establishment cause is related to RNA update. The UE context response message may piggyback a RRC message requesting a UE to move to a RRC inactive state. The first base station may determine that the first BS keeps a UE context based on the RRC establishment cause which is related to RNA update. Further, the first base station may generate the UE context response message not to include a UE context requested by the UE context request message. The RRC message may be RRC resume message or RRC release message. The UE context response message may be retrieve UE context fail message.

According to embodiments of the present invention, last serving gNB does not need to send the UE context to the current serving gNB, and the current serving gNB does not need to perform the core network and path switch procedures, if the UE sends a periodic RNAU and the context of the UE does not need to be moved to the serving gNB. That is, the anchor gNB can selectively fetch the UE context towards new gNB in order to relocate the role of the anchor gNB. For the periodic RNAU, since the UE moves back into the RRC-INACTIVE state, it is possible for the anchor gNB to decide whether to transfer UE context to new gNB.

Figure 9:
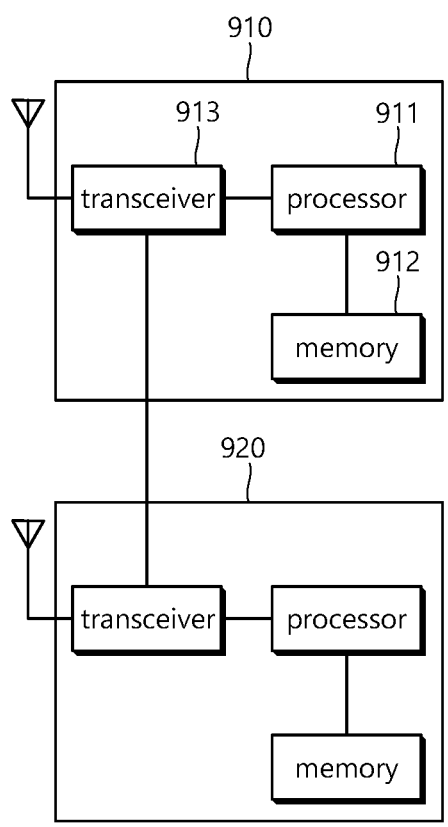
FIG. 9 shows a structure of network according to an embodiment of the present invention.

FIG. 9 shows a structure of network according to an embodiment of the present invention. A first network node 910 shown in FIG. 9 may be a first base station (BS), which may be one of eNB or gNB. A second network node 920 may be a second BS, which may be one of eNB or gNB.

A first network node 910 includes a processor 911, a memory 912, and a transceiver 913. The memory 912 is coupled to the processor 911, and stores a variety of information for driving the processor 911. The transceiver 913 is coupled to the processor 911, and transmits and/or receives a radio signal. The processor 911 implements the proposed functions, procedures, and/or methods. In the aforementioned embodiments, an operation of the first network node may be implemented by the processor 911.

The processors 911 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

The processor 911 may be configured to control the transceiver 913 to receive a UE context request message including a radio resource control (RRC) establishment cause from a second BS. The first BS and the second BS may be located in a same radio access network (RAN)-based notification area (RNA). The first BS may be last serving base station, and the second BS may be a current serving base station.

The processor 911 may be configured to control the transceiver 913 to transmit a UE context response message to the second BS if the RRC establishment cause is related to RNA update. The UE context response message may piggyback a RRC message requesting a UE to move to a RRC inactive state. The first base station may determine that the first BS keeps a UE context based on the RRC establishment cause which is related to RNA update. Further, the first base station may generate the UE context response message not to include a UE context requested by the UE context request message. The RRC message may be RRC resume message or RRC release message. The UE context response message may be retrieve UE context fail message.

According to embodiments of the present invention, last serving gNB does not need to send the UE context to the current serving gNB, and the current serving gNB does not need to perform the core network and path switch procedures, if the UE sends a periodic RNAU and the context of the UE does not need to be moved to the serving gNB. That is, the anchor gNB can selectively fetch the UE context towards new gNB in order to relocate the role of the anchor gNB. For the periodic RNAU, since the UE moves back into the RRC-INACTIVE state, it is possible for the anchor gNB to decide whether to transfer UE context to new gNB.

Figure 10:
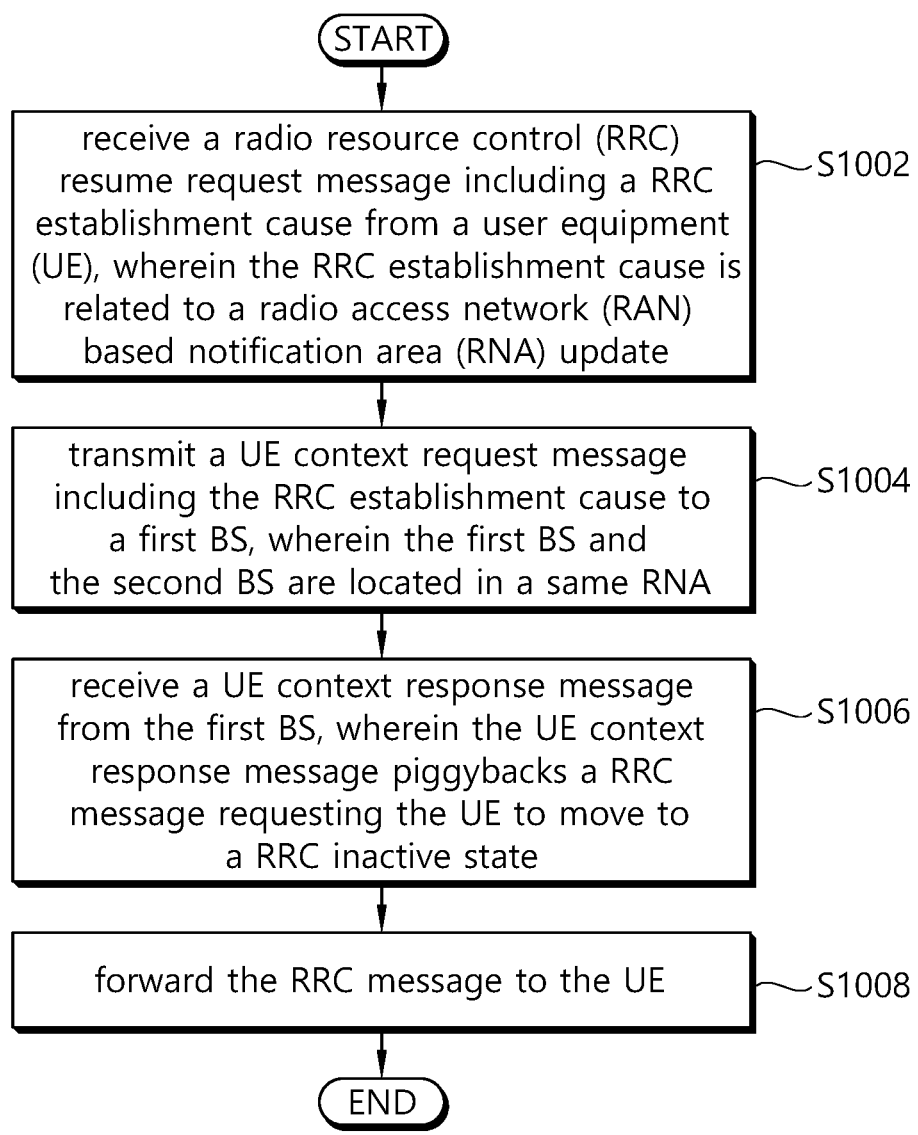
FIG. 10 shows an example of a method for managing UE context according to the present invention.

FIG. 10 shows an example of a method for managing UE context according to the present invention.

In step S1002, the second base station (BS) may receive a RRC resume request message including a RRC establishment cause from a user equipment (UE). The RRC establishment cause may be related to a radio access network (RAN)-based notification area (RNA) update. The first BS may be last serving base station, and the second BS may be a current serving base station.

In step S1004, the second BS may transmit a UE context request message including the RRC establishment cause to a first BS. The first BS and the second BS may be located in a same RNA.

In step S1006, the second BS may receive a UE context response message from the first BS. The UE context response message may piggyback a RRC message requesting the UE to move to a RRC inactive state. The UE context response message may not include a UE context requested by the UE context request message. The UE context response message may be retrieve UE context fail message.

In step S1008, the second BS may forward the RRC message to the UE.

According to embodiments of the present invention, last serving gNB does not need to send the UE context to the current serving gNB, and the current serving gNB does not need to perform the core network and path switch procedures, if the UE sends a periodic RNAU and the context of the UE does not need to be moved to the serving gNB. That is, the anchor gNB can selectively fetch the UE context towards new gNB in order to relocate the role of the anchor gNB. For the periodic RNAU, since the UE moves back into the RRC-INACTIVE state, it is possible for the anchor gNB to decide whether to transfer UE context to new gNB.

Figure 11:
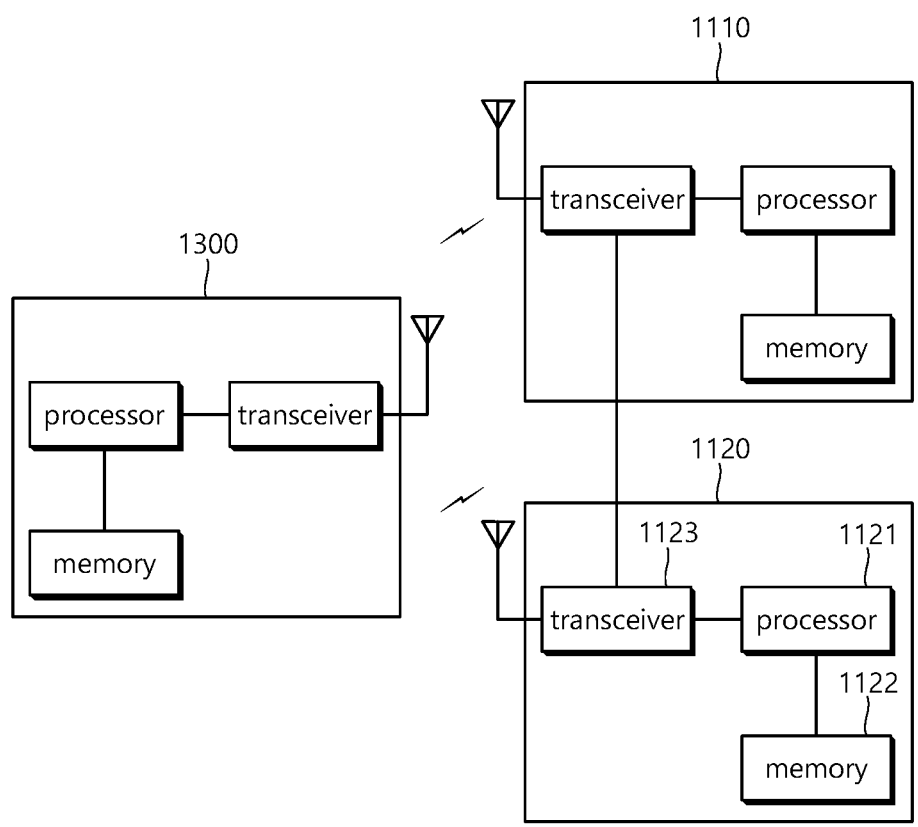
FIG. 11 shows a structure of network according to an embodiment of the present invention.

FIG. 11 shows a structure of network according to an embodiment of the present invention. A first network node 1110 shown in FIG. 11 may be a first base station (BS), which may be one of eNB or gNB. A second network node 1120 may be a second BS, and a second network node 1130 may be a UE.

A second network node 1120 includes a processor 1121, a memory 1122, and a transceiver 1123. The memory 1122 is coupled to the processor 1121, and stores a variety of information for driving the processor 1121. The transceiver 1123 is coupled to the processor 1121, and transmits and/or receives a radio signal. The processor 1121 implements the proposed functions, procedures, and/or methods. In the aforementioned embodiments, an operation of the first network node may be implemented by the processor 1121.

The processors 1121 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

The processor 1121 may be configured to control the transceiver 1123 to receive a RRC resume request message including a RRC establishment cause from a user equipment (UE). The RRC establishment cause may be related to a radio access network (RAN)-based notification area (RNA) update. The first BS may be last serving base station, and the second BS may be a current serving base station.

The processor 1121 may be configured to control the transceiver 1123 to transmit a UE context request message including the RRC establishment cause to a first BS. The first BS and the second BS may be located in a same RNA.

The processor 1121 may be configured to control the transceiver 1123 to receive a UE context response message from the first BS. The UE context response message may piggyback a RRC message requesting the UE to move to a RRC inactive state. The UE context response message may not include a UE context requested by the UE context request message. The UE context response message may be retrieve UE context fail message.

The processor 1121 may be configured to control the transceiver 1123 to forward the RRC message requesting the UE to move to a RRC inactive state.

According to embodiments of the present invention, last serving gNB does not need to send the UE context to the current serving gNB, and the current serving gNB does not need to perform the core network and path switch procedures, if the UE sends a periodic RNAU and the context of the UE does not need to be moved to the serving gNB. That is, the anchor gNB can selectively fetch the UE context towards new gNB in order to relocate the role of the anchor gNB. For the periodic RNAU, since the UE moves back into the RRC-INACTIVE state, it is possible for the anchor gNB to decide whether to transfer UE context to new gNB.

Figure 12:
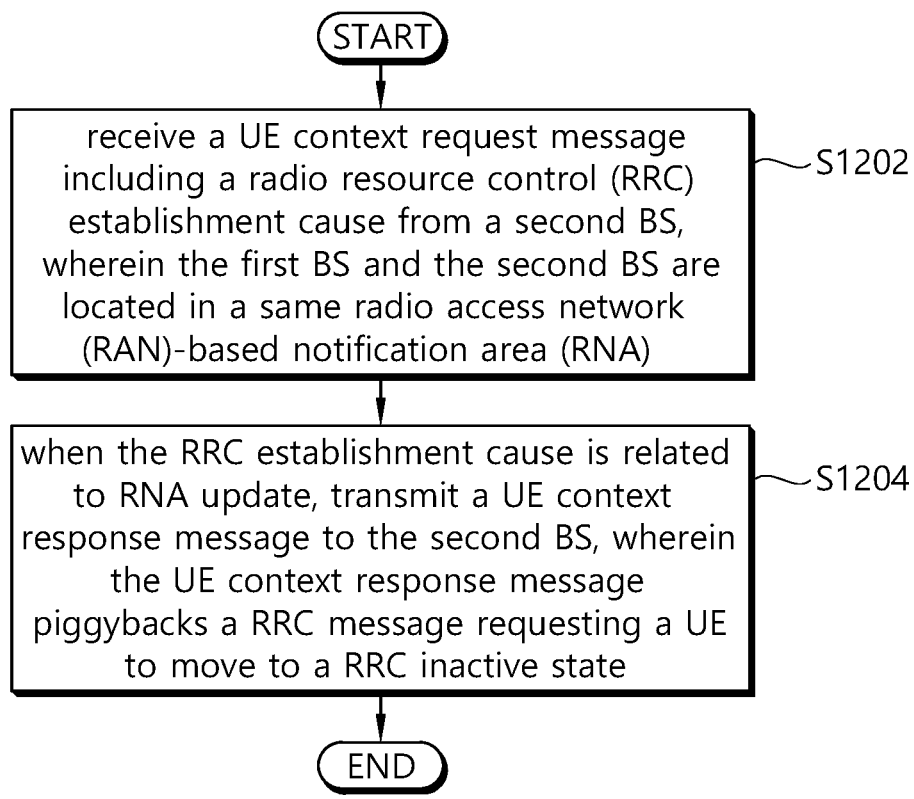
FIG. 12 shows an example of a method for managing UE context according to the present invention.

FIG. 12 shows an example of a method for managing UE context according to the present invention.

In step S1202, the UE may transmit a RRC resume request message including a RRC establishment cause from a user equipment (UE) to the second BS. The RRC establishment cause may be related to a radio access network (RAN)-based notification area (RNA) update. The second BS may be a current serving base station.

In step S1204, the UE may receive a RRC message requesting the UE to move to a RRC inactive state from the second BS.

According to embodiments of the present invention, last serving gNB does not need to send the UE context to the current serving gNB, and the current serving gNB does not need to perform the core network and path switch procedures, if the UE sends a periodic RNAU and the context of the UE does not need to be moved to the serving gNB. That is, the anchor gNB can selectively fetch the UE context towards new gNB in order to relocate the role of the anchor gNB. For the periodic RNAU, since the UE moves back into the RRC-INACTIVE state, it is possible for the anchor gNB to decide whether to transfer UE context to new gNB.

Figure 13:
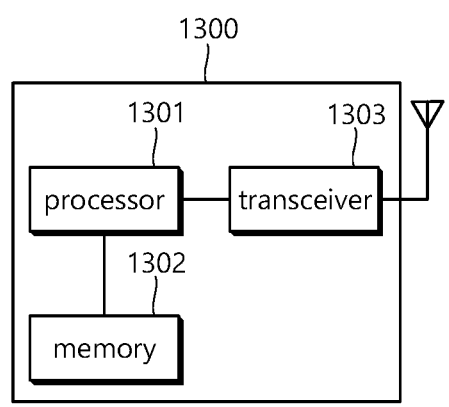
FIG. 13 shows a structure of UE according to an embodiment of the present invention.

FIG. 13 shows a structure of UE according to an embodiment of the present invention.

According to an embodiment of the present invention, the UE 1300 may comprise transceiver 1302, processor 1304 and memory 1306. The memory 1306 is coupled to the processor 1304, and stores a variety of information for driving the processor 1304. The transceiver 1302 is coupled to the processor 1304, and transmits and/or receives a radio signal. The processor 1304 implements the proposed functions, procedures, and/or methods. In the aforementioned embodiments, an operation of the UE 1300 may be implemented by the processor 1304.

The processor 1304 may include application-specific integrated circuit (ASIC), other chipset, logic circuit and/or data processing device. The memory 1306 may include read-only memory (ROM), random access memory (RAM), flash memory, memory card, storage medium and/or other storage device. The transceiver 1302 may include baseband circuitry to process radio frequency signals. When the embodiments are implemented in software, the techniques described herein can be implemented with modules (e.g., procedures, functions, and so on) that perform the functions described herein. The modules can be stored in memories and executed by processor 1304. The memory 1306 can be implemented within the processor 1304 or external to the processor 1204 in which case those can be communicatively coupled to the processor 1304 via various means as is known in the art.

The processor 1304 may be configured to control the transceiver 1302 to transmit a RRC resume request message including a RRC establishment cause from a user equipment (UE) to the second BS. The RRC establishment cause may be related to a radio access network (RAN)-based notification area (RNA) update. The second BS may be a current serving base station.

The processor 1304 may be configured to control the transceiver 1302 to receive a RRC message requesting the UE to move to a RRC inactive state from the second BS.

According to embodiments of the present invention, last serving gNB does not need to send the UE context to the current serving gNB, and the current serving gNB does not need to perform the core network and path switch procedures, if the UE sends a periodic RNAU and the context of the UE does not need to be moved to the serving gNB. That is, the anchor gNB can selectively fetch the UE context towards new gNB in order to relocate the role of the anchor gNB. For the periodic RNAU, since the UE moves back into the RRC-INACTIVE state, it is possible for the anchor gNB to decide whether to transfer UE context to new gNB.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a first base station (BS) in a wireless communication system, the method comprising:
   receiving, from a second BS, a retrieve user equipment (UE) context request message which includes (1) a cause informing a radio access network (RAN)-based notification area (RNA) update for a UE and (2) a signaling radio bearer (SRB) configuration associated with the second BS,
   wherein the cause informing the RNA update is transmitted, from the UE, via a Radio Resource Control (RRC) connection resume request message;
   deciding to skip transfer of a UE context for the UE based on the cause informing the RNA update;
   generating an RRC connection resume message based on the SRB configuration associated with the second BS; and
   transmitting, to the second BS, a response message in response to the retrieve UE context request message, wherein the response message includes a container which piggybacks the RRC connection resume message requesting the UE to move to an RRC inactive state,
   wherein the RRC connection resume message is to be transparently forwarded to the UE via the second BS, and
   wherein the first BS and the second BS are located in a same RNA.

2. The method of claim 1, wherein the response message does not include the UE context.

3. The method of claim 1, wherein the first BS is last serving base station, and the second BS is a current serving base station.

4. The method of claim 1, wherein the UE is in communication with at least one of a mobile device, a network, and/or autonomous vehicles other than the UE.

5. A first base station (B S) in a wireless communication system, the first BS comprising:
   a transceiver; and
   a processor coupled to the transceiver,
   wherein the first BS is configured to:
   receive, from a second BS, a retrieve user equipment (UE) context request message which includes (1) a cause informing a radio access network (RAN)-based notification area (RNA) update for a UE and (2) a signaling radio bearer (SRB) configuration associated with the second BS,
   wherein the cause informing the RNA update is transmitted, to the second BS from the UE, via a Radio Resource Control (RRC) connection resume request message;
   decide to skip transfer of a UE context for the UE based on the cause informing the RNA update for the UE;
   generate an RRC connection resume message based on the SRB configuration associated with the second BS; and
   transmit, to the second BS, a response message in response to the retrieve UE context request message, wherein the response message includes a container which piggybacks the RRC connection resume message requesting the UE to move to an RRC inactive state,
   wherein the RRC connection resume message is to be transparently forwarded to the UE via the second BS, and
   wherein the first BS and the second BS are located in a same RNA.

6. The first BS of claim 5, wherein the response message does not include the UE context.

7. The first BS of claim 5, wherein the first BS is last serving base station, and the second BS is a current serving base station.

* * * * *